(12) United States Patent
Kuroishi

(10) Patent No.: US 10,319,495 B2
(45) Date of Patent: Jun. 11, 2019

(54) CONDUCTIVE PATH

(71) Applicant: Sumitomo Wiring Systems, Ltd., Yokkaichi, Mie (JP)

(72) Inventor: Ryo Kuroishi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/712,930

(22) Filed: Sep. 22, 2017

(65) Prior Publication Data

US 2018/0102202 A1 Apr. 12, 2018

(30) Foreign Application Priority Data

Oct. 11, 2016 (JP) ................. 2016-199857

(51) Int. Cl.
| | |
|---|---|
| *H01B 7/00* | (2006.01) |
| *H01R 4/02* | (2006.01) |
| *B60R 16/02* | (2006.01) |
| *H01R 12/63* | (2011.01) |
| *H02G 15/18* | (2006.01) |
| *H01R 4/72* | (2006.01) |
| *H01R 43/02* | (2006.01) |
| *H01R 43/28* | (2006.01) |

(52) U.S. Cl.
CPC ........ *H01B 7/0009* (2013.01); *B60R 16/0215* (2013.01); *H01R 4/021* (2013.01); *H01R 12/63* (2013.01); *H02G 15/1806* (2013.01); *H01R 4/72* (2013.01); *H01R 43/02* (2013.01); *H01R 43/0207* (2013.01); *H01R 43/28* (2013.01); *H01R 2201/26* (2013.01)

(58) Field of Classification Search
CPC .... H01B 7/0009; H01R 12/63; B60R 16/0215
See application file for complete search history.

(56) References Cited

U.S. PATENT DOCUMENTS

| | | | | | |
|---|---|---|---|---|---|
| 3,626,363 | A | * | 12/1971 | McIver ................. | H01R 4/20 439/880 |
| 3,859,455 | A | * | 1/1975 | Gommans ............ | H01R 9/0503 174/88 C |
| 4,341,921 | A | * | 7/1982 | Simpson ............... | H01R 4/723 174/84 R |

(Continued)

FOREIGN PATENT DOCUMENTS

JP 2016058137 A 4/2016

*Primary Examiner* — William H. Mayo, III
*Assistant Examiner* — Hiram E Gonzalez
(74) *Attorney, Agent, or Firm* — Reising Ethington, P.C.

(57) ABSTRACT

A conductive path includes: a first conductor in which a terminal end portion serves as a first connection portion; a second conductor in which a second connection portion at a terminal end portion is coaxially fixed to the first connection portion; a support member that is more rigid than the first and second conductors, and is disposed so as to extend along a fixed portion between the first and second connection portions; and a heat-shrinkable tube (holding member) that integrates the support member with the first and second conductors while enveloping the support member. Even when an external force acts on the first and second conductors so as to skew the axes of the two conductors, the support member and the heat-shrinkable tube keep the two conductors in the coaxial state.

2 Claims, 2 Drawing Sheets

(56) References Cited

U.S. PATENT DOCUMENTS

| | | | |
|---|---|---|---|
| 6,658,735 B2 * | 12/2003 | Ito | H01R 4/183 174/84 C |
| 7,256,348 B1 * | 8/2007 | Endacott | H01R 4/183 174/84 C |
| 2016/0071630 A1 | 3/2016 | Sugino | |

* cited by examiner

CONDUCTIVE PATH

CROSS REFERENCE TO RELATED APPLICATIONS

This application claims the priority of Japanese patent application JP2016-199857 filed on Oct. 11, 2016, the entire contents of which are incorporated herein.

TECHNICAL FIELD

The present invention relates to a conductive path.

BACKGROUND ART

JP2016-058137A discloses a conductive path having a configuration in which a collapsed portion is formed at an end portion of a single-core wire, an end portion of a stranded wire is coaxially welded to the collapsed portion, and the end portion of the single-core wire, the welded portion, and the end portion of the stranded element wires are enveloped by a heat-shrinkable tube.

JP 2016-058137A is an example of related art.

SUMMARY

The welded portion of the above-described conductive path has a relatively high strength when the single-core wire and the stranded wire are pulled in the axial direction. However, when an external force acts on the single-core wire and the stranded wire so as to skew the axes of the two wires, there is concern that disconnection may occur at the welded portion.

The present design has been completed based on the above-described situation, and it is an object thereof to provide a conductive path having high connection reliability.

According to an aspect of the present design, a conductive path includes:

a first conductor in which a terminal end portion serves as a first connection portion;

a second conductor in which a second connection portion at a terminal end portion is coaxially fixed to the first connection portion;

a support member that is more rigid than the first conductor and the second conductor, and is disposed so as to extend along a fixed portion between the first connection portion and the second connection portion; and a holding member that envelopes the support member and integrates the support member with the first conductor and the second conductor.

Even when an external force acts on the first conductor and the second conductor so as to skew the axes of the two conductors, the support member and the holding member keep the two conductors in the coaxial state. Accordingly, there is no concern of the first connection portion and the second connection being disconnected at the fixed portion. Therefore, the conductive path according to this aspect has excellent connection reliability.

EMBODIMENTS

In the conductive path according to the present design, the support member may have a substantially tubular shape, and envelopes the first conductor and the second conductor. With this configuration, it is possible to prevent the holding member from coming into direct contact with the fixed portion. Accordingly, even when there are burrs on the fixed portion, there is no concern that the holding member will be damaged by the burrs.

The conductive path may include an axial slit that is formed in the support member, and allows the support member to be elastically deformed so as to change a radial dimension thereof. With this configuration, it is possible to attach the support member to the first conductor and the second conductor in the radial direction by elastically deforming the support member so as to expand the slit.

The conductive path may include a cut-out portion that is formed in a region of the support member that corresponds to the fixed portion, is in communication with the slit, and has a circumferential opening width larger than that of the slit. With this configuration, it is possible to prevent the support member from interfering with the fixed portion during attachment of the support member to the first conductor and the second conductor.

In the conductive path, a first wire may be formed by enveloping the first conductor with a first insulating covering, a second wire may be formed by enveloping the second conductor with a second insulating covering, and the holding member may come into intimate contact with and envelope an outer circumferential surface of the support member, an outer circumferential surface of the first wire, and an outer circumferential surface of the second wire in a liquid-tight manner. With this configuration, the holding member achieves a sealing function, thus making it possible to keep the fixed portion between the first conductor and the second conductor in a liquid-tight state.

Embodiment 1

Figure 1:
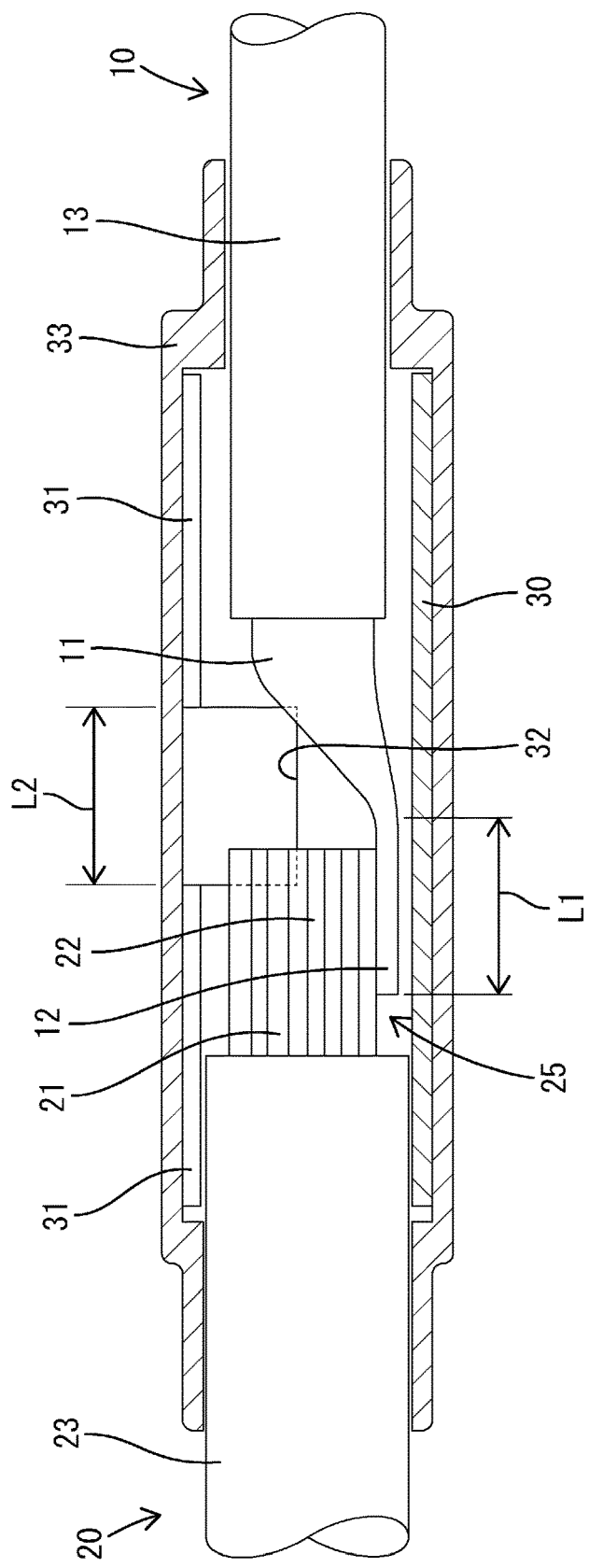
FIG. 1 is a cross-sectional side view of a conductive path according to Embodiment 1.
Figure 2:
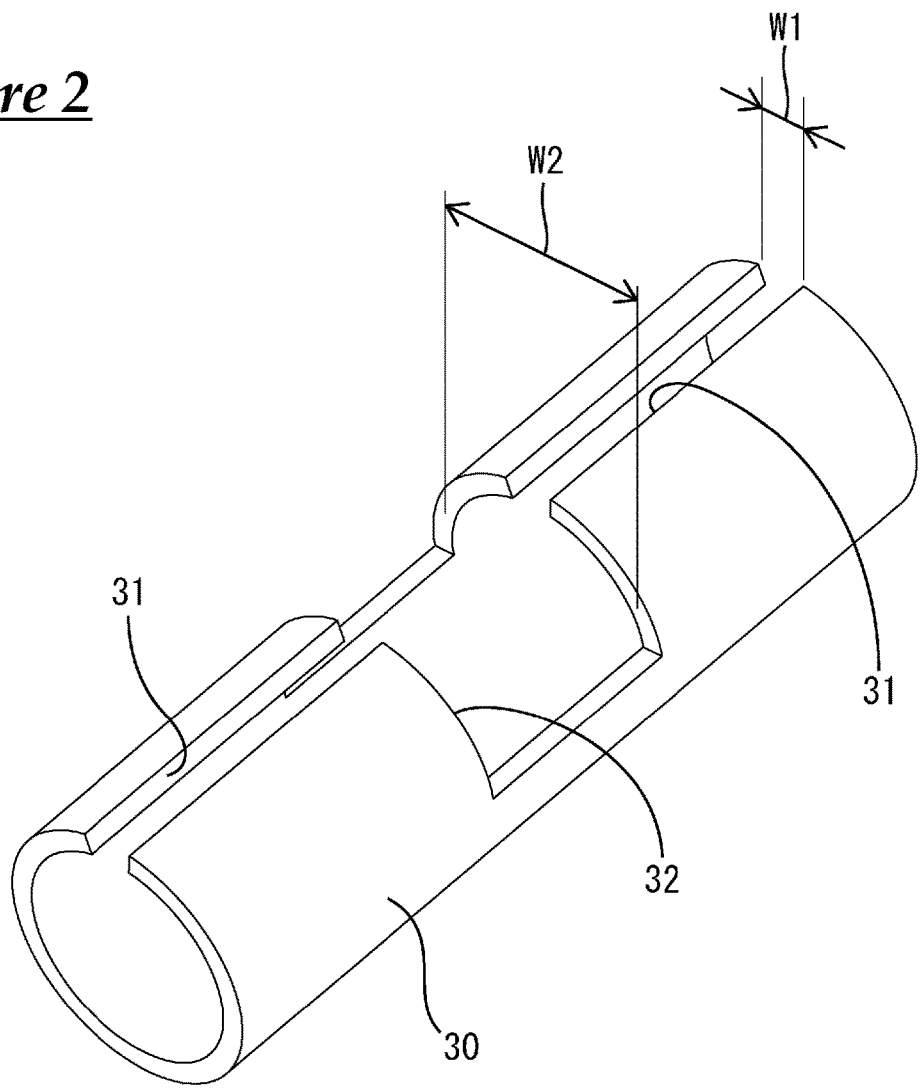
FIG. 2 is a perspective view of a support member.

Hereinafter, Embodiment 1 will be described with reference to FIGS. 1 to 2. A conductive path according to the present embodiment includes a first wire 10, a second wire 20, a support member 30, and a heat-shrinkable tube 33 (the holding member recited in the claims), and has a configuration in which a terminal end portion of the first wire 10 is connected to a terminal end portion of the second wire 20.

The first wire 10 has a configuration in which a first conductor 11 made of a metal single-core wire is enveloped with a first insulating covering 13 made of a synthetic resin. At the terminal end portion of the first wire 10, the first insulating covering 13 has been removed, and the first conductor 11 protrudes toward the second wire 20 so as to be exposed from a distal end of the first insulating covering 13. A first connection portion 12 is formed at the distal end part of the exposed portion of the first conductor 11 by collapsing the first conductor 11 into a flat shape.

The second wire 20 has a configuration in which a second conductor 21 made of a stranded wire obtained by twisting a plurality of bare metal element wires together is enveloped with a second insulating covering 23 made of a synthetic resin. The outer diameter of the second wire 20 has a dimension slightly smaller than the outer diameter of the first wire 10. At the terminal end portion of the second wire 20, the second insulating covering 23 has been removed, and the second conductor 21 protrudes toward the first wire 10 so as to be exposed from a distal end of the second insulating covering 23. A second connection portion 22 is formed at the distal end part of the exposed portion of the second conductor 21 by untwisting the element wires.

The second connection portion 22 is placed on a flat upper surface of the first connection portion 12, and the first connection portion 12 and the second connection portion 22 are fixed coaxially and conductively and integrated with each other through ultrasonic welding.

The support member 30 is made of a synthetic resin, and has a substantially tubular shape with an overall substantially circular cross section. The support member 30 is more rigid than the first wire 10 and the second wire 20. In the support member 30, a slit 31 extending along the axial direction is continuously formed over the entire length of the support member 30. The support member 30 is configured to be elastically deformable so as to increase or decrease the diameter by changing the circumferential opening width of the slit 31. The inner diameter of the support member 30 when the support member 30 is in a free state in which it is not elastically deformed is set to have a dimension slightly larger than that of the outer diameter of the first wire 10.

A cut-out portion 32 that is in communication with the slit 31 is formed at an axial central portion of the support member 30. When the support member 30 is viewed in the radial direction in the free state in which the support member 30 is not elastically deformed, a circumferential opening width W2 of the cut-out portion 32 is sufficiently larger than an opening width W1 of the slit 31. The opening width W1 of the slit 31 is set to have a dimension smaller than the outer diameters of the first wire 10 and the second wire 20. The opening width W2 of the cut-out portion 32 is set to have a dimension that is the same as or larger than the width dimension of the first connection portion 12. An axial length dimension L2 of the cut-out portion is set to have a dimension that is slightly larger than a length dimension L1 of the first connection portion 12.

The heat-shrinkable tube 33 is a synthetic resin member having the property of shrinking when heat is applied. The inner diameter of the heat-shrinkable tube 33 before being heat-shrunk has a dimension that is slightly larger than the outer diameter of the support member 30. The axial length dimension of the heat-shrinkable tube 33 is also set to be larger than the axial length dimension of the support member 30 after the heat-shrinkable tube 33 has been heat-shrunk.

To assemble the conductive path, the heat-shrinkable tube 33 before being heat-shrunk is first externally fitted onto one of the first wire 10 and the second wire 20, and the first connection portion 12 is then integrated with the second connection portion 22 through ultrasonic welding. Next, the support member 30 is elastically deformed so as to increase the diameter thereof to expand the slit 31 to be wider than the outer diameters of the first wire 10 and the second wire 20. In this state, the support member 30 is externally fitted onto the terminal end portion of the first wire 10 and the terminal end portion of the second wire 20.

At this time, the cut-out portion 32 is disposed so as to correspond to the first connection portion 12 in the axial direction such that the wide fixed portion 25 between the first connection portion 12 and the second connection portion 22 passes through the cut-out portion 32. This can prevent the fixed portion 25 from interfering with the support member 30. The support member 30 externally fitted onto the two wires 10 and 20 is disposed so as to envelope the fixed portion 25 between the first connection portion 12 and the second connection portion 22, or to extend along the fixed portion 25. Opposite end portions of the support member 30 are externally fitted onto a region of the terminal end portion of the first wire 10 that is enveloped by the first insulating covering 13, and a region of the terminal end portion of the second wire 20 that is enveloped by the second insulating covering 23.

After the support member 30 has been attached, the heat-shrinkable tube 33 before being heat-shrunk is axially displaced so as to be externally fitted to the support member 30. At this time, one end portion of the heat-shrinkable tube 33 protrudes from one end portion of the support member 30 so as to cover the first insulating covering 13 of the first wire 10, and the other end portion of the heat-shrinkable tube 33 protrudes from the other end portion of the support member 30 so as to cover the second insulating covering 23 of the second wire 20.

In this state, the heat-shrinkable tube 33 is heated so as to shrink in the radial direction. Consequently, the region of the heat-shrinkable tube 33 that excludes the opposite end portions in the axial direction (length direction) is brought into intimate contact with the outer circumferential surface of the support member 30 in a liquid-tight manner. In addition, the opposite end portions of the heat-shrinkable tube 33 are brought into intimate contact with the outer circumferential surface of the first insulating covering 13 and the outer circumferential surface of the second insulating covering 23 in a liquid-tight manner. When the heat-shrinkable tube 33 has been shrunk, the relative displacement of the support member 30 with respect to the first wire 10 and the second wire 20 in the axial direction and the circumferential direction is limited by the frictional resistance generated between the inner circumferential surface of the heat-shrinkable tube 33 and the outer circumferential surface of the support member 30, between the inner circumferential surface of the heat-shrinkable tube 33 and the outer circumferential surface of the first insulating covering 13, and between the inner circumferential surface of the heat-shrinkable tube 33 and the outer circumferential surface of the second insulating covering 23. Consequently, the support member 30, the terminal end portion of the first wire 10, and the terminal end portion of the second wire 20 are integrated together by the heat-shrinkable tube 33.

When a bending force acts on the first wire 10 and the second wire 20 so as to skew the axes of the two wires, the outer circumferential surface of the first insulating covering 13 and the outer circumferential surface of the second insulating covering 23 abut against the inner circumferential surface of the support member 30, and the bending force applied to the two wires 10 and 20 acts on the support member 30. However, the support member 30 is more rigid than the first wire 10 and the second wire 20, and therefore, there is no concern that the support member 30 will deform and curve the axes thereof. Accordingly, the first connection portion 12 and the second connection portion 22 are kept in the coaxially fixed state.

As a result of the heat-shrinkable tube 33 being heat-shrunk, the gap between the inner circumferential surface of the support member 30 and the outer circumferential surface of the first wire 10 (first insulating covering 13) is sealed in a liquid-tight manner at one end portion of the support member 30, and the gap between the inner circumferential surface of the support member 30 and the outer circumferential surface of the second wire 20 (second insulating covering 23) is sealed in a liquid-tight manner at the other end portion of the support member 30. This can prevent water from wetting the fixed portion 25 between the first connection portion 12 and the second connection portion 22, and prevent water from entering the gap between the first conductor 11 and the first insulating covering 13, the gap between the second conductor 21 and the second insulating covering 23, and the gap between the bare metal element wires constituting the second conductor 21.

The conductive path of the present embodiment includes the first conductor 11 in which the terminal end portion serves as the first connection portion 12, the second conductor 21 in which the second connection portion 22 at the terminal end portion is coaxially fixed to the first connection portion 12, the support member 30, and the heat-shrinkable tube 33 that envelopes the support member 30. The support member 30 is more rigid than the first conductor 11 (first wire 10) and the second conductor 21 (second wire 20), is disposed so as to extend along the fixed portion 25 between the first connection portion 12 and the second connection portion 22, and the support member 30 is integrated with the first conductor 11 and the second conductor 21 by the heat-shrinkable tube 33.

With this configuration, even when an external force (bending force) acts on the first conductor 11 and the second conductor 21 so as to skew the axes of the two conductors, the support member 30 and the heat-shrinkable tube 33 keep the two conductors 11 and 21 in the coaxial state. Accordingly, there is no concern that the first connection portion 12 and the second connection portion 22 will become disconnected at the fixed portion 25. Therefore, the conductive path of the present embodiment has excellent connection reliability.

Since the support member 30 has a substantially tubular shape, and envelopes the first conductor 11 and the second conductor 21, it is possible to prevent the heat-shrinkable tube 33 from coming into direct contact with the fixed portion 25. Accordingly, even when there are burrs on the fixed portion 25 (the first connection portion 12 or the second connection portion 22), there is no concern that the heat-shrinkable tube 33 will be damaged by the burrs.

The axial slit 31 that allows the support member 30 to elastically deform so as to change the radial dimension is formed in the support member 30. With this configuration, it is possible to attach the support member 30 to the first conductor 11 and the second conductor 21 in the radial direction by elastically deforming the support member 30 so as to expand the slit 31. This can achieve better workability compared with a case where the first conductor 11 or the second conductor 21 is inserted into the support member 30 in the axial direction.

The cut-out portion 32 that is in communication with the slit 31 and has a circumferential opening width W2 larger than the opening width W1 of the slit 31 is formed in the region of the support member 30 that corresponds to the fixed portion 25. With this configuration, it is possible to prevent the support member 30 from interfering with the fixed portion 25 when attaching the support member 30 to the first conductor 11 and the second conductor 21.

The first wire 10 is formed by enveloping the first conductor 11 with the first insulating covering 13, the second wire 20 is formed by enveloping the second conductor 21 with the second insulating covering 23, and the heat-shrinkable tube 33 comes into intimate contact with and envelopes the outer circumferential surface of the support member 30, the outer circumferential surface of the first wire 10, and the outer circumferential surface of the second wire 20 in a liquid-tight manner. With this configuration, the heat-shrinkable tube 33 achieves a sealing function, thus making it possible to keep the fixed portion 25 between the first conductor 11 and the second conductor 21 in a liquid-tight state.

Other Embodiments

The present invention is not limited to the embodiment described in connection with the foregoing description and drawings. For example, the following embodiments also fall within the technical scope of the present invention.

Although the first conductor is made of a single-core wire and the second conductor is made of a stranded wire in the above-described embodiment, both the first conductor and the second conductor may be made of a single-core wire, or both the first conductor and the second conductor may be made of a stranded wire.

Although the holding member has a sealing function in the above-described embodiment, the holding member does not need to have a sealing function.

Although the support member has a substantially tubular shape in the above-described embodiment, the support member may have an elongated bar shape, a trough-like shape, or the like.

Although the support member is configured to be elastically deformable so as to change the radial dimension by the axial slit in the above-described embodiment, the support member may have a configuration that does not allow elastic deformation.

Although the first connection portion and the second connection portion are fixed and integrated with each other through ultrasonic welding in the above-described embodiment, the first connection portion and the second connection portion may be fixed using a method other than ultrasonic welding.

Although the holding member is a heat-shrinkable tube in the above-described embodiment, the holding member may be a member with a heat-shrinkable tube wound therearound.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 First wire
11 First conductor
12 First connection portion
13 First insulating covering
20 Second wire
21 Second conductor
22 Second connection portion
23 Second insulating covering
25 Fixed portion
30 Support member
31 Slit 32 Cut-out portion
33 Heat-shrinkable tube (holding member)
W1 Opening width of slit
W2 Opening width of cut-out portion

What is claimed is:

1. A conductive path comprising:
a first conductor in which a terminal end portion serves as a first connection portion;
a second conductor in which a terminal end portion serves as a second connection portion, the first connection portion and the second connection portion are coaxially fixed to one another at a fixed portion so that the first conductor and the second conductor are mechanically and electrically connected;
a support member that is made of synthetic resin, is more rigid than the first conductor and the second conductor, and is disposed so as to extend along the fixed portion between the first connection portion and the second connection portion, wherein the support member has a substantially tubular shape, and envelopes the first conductor and the second conductor;
an axial slit that is formed in the support member, and allows the support member to be elastically deformed so as to change a radial dimension thereof;
a cut-out portion that is formed in a region of the support member that corresponds to the fixed portion, is in communication with the slit, and has a circumferential opening width larger than that of the slit; and
a holding member that integrates the support member with the first conductor and the second conductor while enveloping the support member.

2. The conductive path according to claim 1, wherein
a first wire is formed by enveloping the first conductor with a first insulating covering,
a second wire is formed by enveloping the second conductor with a second insulating covering, and
the holding member comes into intimate contact with and envelopes an outer circumferential surface of the support member, an outer circumferential surface of the first wire, and an outer circumferential surface of the second wire in a liquid-tight manner.

* * * * *